US009593888B2

(12) United States Patent
Noureldin et al.

(10) Patent No.: US 9,593,888 B2
(45) Date of Patent: Mar. 14, 2017

(54) ENERGY-EFFICIENT AND ENVIRONMENTALLY ADVANCED CONFIGURATIONS FOR NAPHTHA HYDROTREATING PROCESS

(71) Applicant: Saudi Arabian Oil Company, Dhahran (SA)

(72) Inventors: Mahmoud Bahy Noureldin, Dhahran (SA); Ahmed Saleh Bunaiyan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/074,285

(22) Filed: Mar. 18, 2016

(65) Prior Publication Data
US 2016/0201997 A1    Jul. 14, 2016

Related U.S. Application Data

(63) Continuation of application No. 13/099,144, filed on May 2, 2011, now Pat. No. 9,321,972.

(51) Int. Cl.
F28D 21/00 (2006.01)
C10G 45/04 (2006.01)
B23P 15/26 (2006.01)

(52) U.S. Cl.
CPC .......... *F28D 21/0012* (2013.01); *B23P 15/26* (2013.01); *C10G 45/04* (2013.01); *C10G 2300/1044* (2013.01); *C10G 2400/02* (2013.01); *F28D 2021/0059* (2013.01); *Y02P 30/10* (2015.11)

(58) Field of Classification Search
CPC ......... F28D 21/0012; F28D 2021/0059; C10G 45/04; C10G 2300/1044; C10G 2400/02; B23P 15/26; Y02P 30/10
See application file for complete search history.

(56) References Cited

U.S. PATENT DOCUMENTS 3,607,734 A   9/1971   Stafford, Sr.
4,087,354 A   5/1978   Hessler
(Continued)

OTHER PUBLICATIONS

Kemp, Ian C. (2007). Pinch Analysis and Process Integration—A User Guide on Process Integration for the Efficient Use of Energy (2nd Edition). Elsevier. Online version available at: http://app.knovel.com/hotlink/toc/id:kpPAPIAUG1/pinch-analysis-process/pinch-analysis-process.
(Continued)

*Primary Examiner* — Randy Boyer
*Assistant Examiner* — Juan Valencia
(74) *Attorney, Agent, or Firm* — Bracewell LLP; Constance G. Rhebergen; Brian H. Tompkins

(57) ABSTRACT

Systems and methods of hydrotreating different naphtha feed stocks destined for a refining reforming unit and other applications with less energy consumption than conventionally possible, while producing less greenhouse gas emissions, and/or using a lesser number of heaters and correspondingly less capital investment in such heaters, air coolers, and water coolers, are provided. According to the more examples of such systems and methods, such reductions are accomplished by directly integrating a naphtha stripping process section with a naphtha splitting process section. Additional reductions can also be accomplished through directly integrating a naphtha hydrotreat reaction process section with the naphtha stripping process section.

20 Claims, 11 Drawing Sheets

(56) References Cited

U.S. PATENT DOCUMENTS

| | | |
|---|---|---|
| 4,129,606 A | 12/1978 | Gewartowski |
| 4,211,638 A | 7/1980 | Akell et al. |
| 4,274,944 A | 6/1981 | Bannon |
| 4,673,490 A | 6/1987 | Subramanian et al. |
| 5,164,070 A | 11/1992 | Munro |
| 5,453,177 A | 9/1995 | Goebel et al. |
| 2008/0015839 A1 | 1/2008 | Noureldin et al. |

OTHER PUBLICATIONS

PCT International Search Report and Written Opinion dated Sep. 20, 2012 for PCT Application PCT/US2012/036049.
Zukauskas, "Aromatics Production and Use", Giovanni Treccani Encyclopedia of Hydrocarbons, vol. II Dec. 31, 2006, pp. 591-605.
Kataoka, "Energy Saving Process Intensification of an Oil Refinery Distillation Plant by an Internal Heat Integration Method", Proceedings of European Congress of Chemical Engineers, Sep. 20, 2007, pp. 1-15.
Hirata, "Heat Integration of Distillation Column Chemical Engineering Transactions", vol. 18, Dec. 31, 2009, pp. 39-44.
Nakaiwa, "Innovation in distillation processes" Synthesiology, vol. 2, No. 1, Jun. 30, 2009, pp. 55-63.
Douglas, "Heat Exchanger Networks" Conceptual Design of Chemical Processes, Dec. 31, 1988, McGraw-Hill International Editions, Singapore, pp. 216-288.

ENERGY-EFFICIENT AND ENVIRONMENTALLY ADVANCED CONFIGURATIONS FOR NAPHTHA HYDROTREATING PROCESS

CROSS-REFERENCE TO RELATED PATENT APPLICATIONS

This application is a continuation of and claims priority to U.S. patent application Ser. No. 13/099,144 titled "Energy-Efficient and Environmentally Advanced Configurations for Naptha Hydrotreating Process" and filed on May 2, 2011

BACKGROUND OF THE INVENTION

1. Field of the Invention

The present invention relates in general to the field of naphtha hydrotreating processes, and in particular, to systems and methods related to waste heat recovery for naphtha hydrotreating (NHT) processes for the desulfurization of naphtha.

2. Description of the Related Art

A petroleum refinery generally includes multiple separate unit operations and processes. One of the operations/processes includes the continuous distillation of petroleum to form a liquid distillate called naphtha which forms a major component of the refineries' product. After extraction through distillation, naphtha is generally further processed in catalytic reforming units, such as continuous catalyst circulation reactor (CCR) units, which require a certain naphtha feedstock specification to avoid degradation in the catalyst performance and reduced life of the downstream units. The naphtha and other distillates, however, in their initial form include numerous undesirable materials such as sulfur, nitrogen, olefins, and aromatics. In order to prevent damage to such units and to comply with new stringent environmental laws, worldwide, the distillates are subjected to a naphtha hydrotreating (NHT) process to remove the undesirable materials.

The naphtha hydrotreating process for removing such undesirable materials is one of the most mature process technologies in the oil refining processes and its use has become the norm in both old and new refineries. In the fifties of the last century, companies started to license naphtha hydrotreating processes under names such as "Unifining"; "Unionfining", and other processes. Since then, the process has gone through many changes.

The naphtha hydrotreating process functions to remove the undesirable materials (e.g., sulfur, nitrogen, metals) from the petroleum distillates by selectively having these materials react with hydrogen in a catalyst bed at elevated temperature in a reactor unit. The chemistry behind the naphtha hydrotreating process can be divided into a number of reaction categories, called hydro-desulfurization, hydro-denitrification, saturation of olefins, and saturation of aromatics. For each of these reactions, hydrogen is normally used to achieve the desired quality of the petroleum fraction.

Desulfurization is by far the most common of the naphtha hydrotreating reactions. The content and form of the sulfur in hydrocarbons can vary. The reaction rates for different forms of sulfur can also vary significantly. For example, a Thiophenol reaction that results in benzene and hydrogen sulfide (H2S) is typically very rapid.

The degree at which sulfur can be removed from the hydrocarbons can vary from one petroleum distillate to another. In naphtha, however, sulfur removal can reach to near complete. Regardless of the content, form, or reaction rate, the desulfurization reaction results in the production of H2S in the reactor. To complete the desulfurization process, such H2S is removed in a downstream fractionation unit.

A main use of the naphtha hydrotreating process in naphtha applications is in the preparation of feed stocks provided to a naphtha reforming unit. A typical hydrotreating process includes a reactor section, a stripper section, and a naphtha splitter section. The reaction section provides hydrogeneration, desulfurization, denitrogenation reactions on a hydrotreatment catalyst. In the reaction section, hydrogen is combined with the feed and the stream is heated up to the desired hydrotreating temperature using a fired heater. The combined feed and hydrogen stream passes downward in a hydrogenation reactor packed with various types of catalyst depending upon reactions desired. The reactor effluent is cooled and a liquid phase from the cooled effluent is sent to the contaminants stripping section. This cooled effluent from the reaction section is preheated, usually against the stripper bottom product stream and then sent to the stripping column. The stripper effluent is cooled and enters the high pressure separator which separates the liquid hydrocarbon from the hydrogen/hydrogen sulfide/ammonia gas. The acid gases are absorbed from the hydrogen in an amine absorber, and hydrogen, minus purges, is recycled with make-up hydrogen. The stripper bottom product provides the "feed" to a naphtha splitter section. This "feed" is first preheated against the splitter bottom stream and sent to the splitter section. In the splitter section, light naphtha is separated from heavy naphtha, which is used as "feed" by a continuous catalyst regeneration and reforming unit (CCR) to produce high octane components. The naphtha hydrotreating process reduces the sulfur and nitrogen in the feedstock to the downstream catalytic reforming process unit to less than 0.5 wt ppm and the metals to non-detectable levels.

Most of the old and recently built naphtha hydrotreating plants use either Axens or UOP processes. These two conventional configurations are almost the same with respect to the configuration of the contaminants stripper and naphtha splitter sections. Recognized by the inventors is that neither configuration exhibits direct integration between the two sections.

Waste heat recovery has been employed in conventional naphtha hydrotreating processes, including in these exemplary processes, in order to reduce the amount of energy consumed. In such processes, the feed to the respect to section is typically preheated by the bottom product of the section and the extra waste heat in the heavy naphtha stream from the naphtha splitter section is sent to the air and water coolers.

Although very simple, the contaminants stripper and a naphtha splitter sections however, use huge amounts of heating utilities, most of the time in the form of fossil fuel consumed in re-firing units assigned to each of the sections. These fired heaters, used to supply the required heating utility, also produce a large quantity of undesirable emissions. In some parts of the world, such emissions are catastrophic to the environment. As noted above, the stripper and splitter sections also require huge cooling utilities in form of air coolers and water coolers. Air coolers are capital and maintenance intensive equipment and water cooling, and in some parts of the world have significant availability and maintenance problems, as well.

Recognized by the inventors is that, even in view of such difficulties surrounding the use of external utilities, such conventional energy recovery methods fail to optimize waste heat recovery within and between the processes.

Accordingly, the inventors have recognized that it would be beneficial to the oil refining industry to hydrotreat different categories/types of naphtha feed stocks destined for a refining reforming unit and other applications with less energy consumption than conventionally possible, while producing less green house gas emissions, and/or using a lesser number of heaters and correspondingly less capital investment in such heaters, air coolers, and water coolers.

Particularly, recognized by the inventors is that it would be beneficial to the oil refining industry to hydrotreat different naphtha feed stocks destined for a refining reforming unit with less energy consumption by (destined for) fired heaters and with less energy consumption by air and/or water coolers, while producing less green house gas emissions. Further, recognized by the inventors is that it would be beneficial to the oil refining industry to hydrotreat the naphtha feed stocks destined for a refining reforming unit using a lesser number of heaters and using less capital investment in plant's heaters, air and water coolers. Still further, recognized by the inventors is that it would be beneficial to the oil refining industry to hydrotreat the naphtha feed stocks destined for refining reforming unit using a process configuration that can be used worldwide in any naphtha hydrotreating process including in places with extreme differences in energy cost. Additionally, it would be also very beneficial to have a naphtha hydrotreating process reaction furnace that is flexible and with a low beta ratio to handle different feed stocks. It would also be extremely beneficial to the refining industry to have a naphtha hydrotreating process configuration with an efficient waste heat recovery system that is retrofitable for more efficient energy usage along the lifetime of the naphtha hydrotreating plant.

SUMMARY OF THE INVENTION

In view of the foregoing, various embodiments of the present invention advantageously provide systems and methods of hydrotreating different naphtha feed stocks destined for a refining reforming unit and other applications with less energy consumption (e.g. in fired heaters and/or air and/or water coolers) than conventionally possible, while producing less green house gas emissions, and/or using a lesser number of heaters and correspondingly less capital investment in such heaters, air coolers, and water coolers than conventionally done. Various embodiments of the present invention advantageously provide systems and methods of hydrotreating different naphtha feed stocks for the desulfurization of naphtha destined for a refining reforming unit that is retrofitable for more efficient energy usage along the lifetime of the naphtha hydrotreating plant. Various embodiments of the present invention advantageously provide systems and methods of hydrotreating different naphtha feed stocks destined for a refining reforming unit using a process configuration that can be used worldwide in any naphtha hydrotreating process including in places with extreme differences in energy cost. Various embodiments of the present invention advantageously provide a naphtha hydrotreating process reaction furnace that is flexible and with a low beta ratio in the reaction section to handle different feed stocks.

Advantageously, various embodiments of the present invention achieve the above advantages/objectives through the direct integration between the stripping and naphtha splitting sections and/or between the reaction, stripping, and naphtha splitting sections, to significantly reduce both the heating and cooling utilities consumption of existing and new processes by at least 20% and 60% respectively, and its associated energy-based emissions by more than million ton of $CO_2$ along the lifetime of the plant.

More specifically, an example of an embodiment of a method of providing hydrotreated naphtha feedstocks to a refining reforming unit includes the step of directly integrating a naphtha stripping process section with a naphtha splitting process section. The step of directly integrating can include providing a reboiling process-to-process heat exchanger unit receiving a bottom stream product of heavy naphtha from a naphtha splitter and a bottom stream product from a naphtha stripper to transfer heat from the bottom stream product from the naphtha stripper to the bottom stream product from the naphtha splitter. The steps of directly integrating can also include providing a fired heater unit operably connected in line with and downstream of the reboiling process-to-process heat exchanger to provide additional heat to the bottom stream product from the naphtha splitter to reboil bottom stream product from naphtha splitter, and conducting reboiling of the heavy naphtha bottom stream product from the naphtha splitter utilizing the naphtha stripper bottom stream product from the naphtha stripper in conjunction with the fired heater unit.

The step of directly integrating can also include providing a high-heat-transfer capacity process-to-process heat exchanger receiving bottom stream product of heavy naphtha from the naphtha splitter (reforming feed to a refining reforming unit) and reactor product from a reactor unit of a reaction process section to aggressively cool the heavy naphtha bottom stream product from the naphtha splitter to less than approximately 200° F., and more preferably down to a temperature of approximately 173° F. Beneficially, such configuration can facilitate further downstream cooling of the heavy naphtha bottom stream product using an air cooler positioned to receive a heavy naphtha bottom stream product feed from the naphtha splitter, to an extent that the combination of high-heat-transfer capacity process-to-process heat exchanger and air cooler is sufficient to negate a need for a non-air-cooled chilling unit.

Another example of an embodiment of a method of providing hydrotreated naphtha feedstocks to a refining reforming unit includes the step of directly integrating a naphtha stripping process section with a naphtha splitting process section. According to this exemplary embodiment of the method, the step of directly integrating includes providing a first reboiling process-to-process heat exchanger unit receiving a bottom stream product of heavy naphtha from a naphtha splitter and a bottom stream product from a naphtha stripper to transfer heat from the bottom stream product from the naphtha stripper to the bottom stream product from the naphtha splitter, and providing a second reboiling heat exchanger unit operably receiving additional bottom stream product from the naphtha stripper and additional bottom stream product from the naphtha splitter so that the additional bottom stream product from the naphtha stripper provides heat energy to the additional bottom stream product from the naphtha splitter to reboil the additional bottom stream product from the naphtha splitter. The step of directly integrating can also include providing a fired heater unit operably connected in line with and downstream of the second process-to-process heat exchanger to reboil bottom stream product from naphtha stripper to replenish heat transferred to the bottom stream product from the naphtha stripper to bottom stream product from the naphtha splitter and to add additional heat thereto sufficient for reboiling.

The direct integration also includes conducting reboiling of the heavy naphtha bottom stream product from the naphtha splitter utilizing both the first reboiling process-to-process heat exchanger unit (receiving heat from the naphtha stripper bottom stream product providing feed to the naphtha splitter) and the second reboiling process-to-process heat exchanger unit (receiving heat from the naphtha stripper bottom stream product enroute to the fired heater unit). Beneficially, according to this exemplary configuration, the first and the second reboiling process-to-process heat exchanger units are collectively configured to provide sufficient heat exchange capacity to reboil the bottom stream product from the naphtha splitter without use of a fired heater unit positioned to directly reboil the bottom stream product from naphtha splitter. That is, in the exemplary configuration, the naphtha splitting process section is devoid of a fired heater unit.

Another example of an embodiment of a method of providing hydrotreated naphtha feedstocks to a refining reforming unit also includes the step of directly integrating a naphtha stripping process section with a naphtha splitting process section, and directly integrating a naphtha hydrotreat reaction process section with the naphtha stripping process section. The step of directly integrating the naphtha stripping process section with the naphtha splitting process section can include providing a first reboiling process-to-process heat exchanger unit receiving a bottom stream product of heavy naphtha from a naphtha splitter and a bottom stream product from a naphtha stripper to transfer heat from the bottom stream product from the naphtha stripper to bottom stream product from the naphtha splitter. The step of directly integrating the naphtha stripping process section with the naphtha splitting process section can also include providing a fired heater unit operably connected in line with and downstream of the first process-to-process heat exchanger to provide additional heat to the bottom stream product from the naphtha splitter to reboil bottom stream product from naphtha splitter, and conducting reboiling of heavy naphtha bottom stream product from the naphtha splitter utilizing the naphtha stripper bottom stream product from the naphtha stripper in conjunction with the fired heater unit.

The step of directly integrating the naphtha hydrotreat reaction process section with the naphtha stripping process section can include providing a second reboiling process-to-process heat exchanger unit receiving bottom stream product from the reactor unit and the bottom stream product from the naphtha stripper so that the bottom stream product from the reactor unit provides heat energy to the bottom stream product from the naphtha stripper. The step of directly integrating the naphtha hydrotreat reaction process section with the naphtha stripping process section can also include conducting reboiling of the naphtha stripper bottom stream product received from the naphtha stripper by the second reboiling process-to-process heat exchanger unit through use of the reactor unit bottom stream product received from the reactor unit.

According to one or more additional configurations, the step of providing the second reboiling process-to-process heat exchanger unit can include increasing the surface area of the heat exchanger unit and/or increasing the flow rate of the bottom stream product from the reactor unit and/or the flow rate of the bottom stream product from the naphtha stripper as necessary to reduce the amount of heating utility required for reboiling the stripper bottom stream product. Notably, the parameter adjustments can be made up to an extent of providing sufficient heat exchange capacity to reboil the bottom stream product from the naphtha stripper without use of a fired heater unit positioned to directly reboil the bottom stream product from naphtha stripper. This beneficially can allow the naphtha stripping process section to be devoid of a fired heater.

Various embodiment of the present invention also include systems to hydrotreat naphtha feedstocks for provision to a refining reforming unit. According to an example of an embodiment of such a system, the system can include a naphtha splitting process section including a naphtha splitter providing heavy naphtha bottom stream product to a refining reforming unit as feed, a naphtha stripping process section including a naphtha stripper providing bottom stream product to the naphtha splitter as feed, and a naphtha hydrotreat reaction process section including a reactor unit providing bottom stream product to the naphtha stripper as feed.

The system can also include a first process-to-process heat exchanger unit positioned to receive bottom stream product from the naphtha stripper and bottom stream product of heavy naphtha from the naphtha splitter so that the bottom stream product from the naphtha stripper provides heat energy to the bottom stream product from the naphtha splitter. A first conduit is operably connected between a bottom stream product outlet port of the naphtha stripper and a first inlet port in the heat exchanger unit. A second conduit is operably connected between a first outlet port of the heat exchanger unit and a naphtha stripper bottom stream product receiving inlet port in the naphtha splitter, with the second conduit being in fluid communication with the first conduit through the heat exchanger unit. A third conduit is operably connected between a bottom stream product outlet port of the naphtha splitter and a second inlet port in the heat exchanger unit. A fourth conduit is operably connected between a second outlet port of the heat exchanger unit and a reboiling inlet port in the naphtha splitter, with the fourth conduit being in fluid communication with the third conduit through the heat exchanger unit.

According to this exemplary configuration, the naphtha splitter, the naphtha stripper, and the heat exchanger unit are operably coupled so that when operationally employed the bottom stream product from the naphtha stripper flowing through the first and the second conduits and associated portions of the heat exchanger unit is in thermal communication with the bottom stream product from the naphtha splitter flowing through the third and the fourth conduits and associated portions of the heat exchanger unit to thereby conduct reboiling of the naphtha bottom stream product from the naphtha splitter through use of the bottom stream product from the naphtha stripper.

The system can also include a high-heat-transfer capacity second process-to-process heat exchanger unit positioned to receive condensed portions of bottom stream product from the reactor unit and the bottom stream product from the naphtha splitter so that the condensed portions of the bottom stream product from the reactor unit extracts substantial heat energy from the bottom stream product from the naphtha splitter. A conduit is operably connected between a bottom stream product outlet port in the reactor unit and a first inlet port in the second heat exchanger unit. Another conduit is operably connected between a first outlet port of the second heat exchanger unit and a naphtha feed inlet port in the naphtha stripper, with this conduit being in fluid communication through the second heat exchanger unit with the conduit connected to the first inlet port. Another conduit is operably connected between a bottom stream product outlet port in the naphtha splitter and a second inlet port in the second heat exchanger unit, and an associated conduit is operably connected between a second outlet port of the second heat exchanger unit and hydrotreated product feed inlet port in a catalytic reformer unit, with this conduit being in fluid communication through the second heat exchanger unit with the conduit connected to the second inlet port.

Similar to the prior described embodiment, according to another embodiment of a system, the reactor unit, the naphtha stripper, and a second heat exchanger unit are operably coupled so that when operationally employed, the bottom stream product from the reactor unit flowing through a respective one of the pairs of conduits and associated portions of the second heat exchanger unit, is in thermal communication with the bottom stream product from the naphtha splitter flowing through the other pair of conduits and associated portions of the second heat exchanger unit to thereby cool the bottom stream product from the naphtha splitter through use of the bottom stream product from the reactor unit. Beneficially, such cooling can be sufficient to negate a need for a non-air cooled chilling unit to be employed between the second outlet port of the second heat exchanger and the hydrotreated product feed inlet port in a catalytic reformer unit.

Accordingly, in this exemplary configuration, the system is devoid of any non-air cooled chilling units associated with the reforming feed. Rather, the system can include an air cooler operably coupled to the second heat exchanger unit and the catalytic reformer unit to receive the heavy naphtha bottom stream product from the naphtha splitter and to provide cooled bottom stream product from the naphtha splitter (reforming feed) to the catalytic reformer unit. Notably, such configuration allows for a temperature of the heavy naphtha bottom stream product provided to the catalytic reformer unit to be less than 200° F., and more typically 173° F., even without use of any non-air cooled chilling units.

According to an embodiment of the system, the system can also or alternatively include a third process-to-process heat exchanger unit positioned to receive bottom stream product from the reactor unit and the bottom stream product from the naphtha stripper so that the bottom stream product from the reactor unit provides heat energy to the bottom stream product from the naphtha stripper. A conduit is operably connected between a bottom stream product outlet port in the reactor unit and a first inlet port in the third heat exchanger unit. Another conduit is operably connected between a first outlet port of the second heat exchanger unit and a reboiling inlet port in the naphtha stripper, with this conduit being in fluid communication through the heat exchanger unit with the conduit connected to the first inlet port. Another conduit is operably connected between a bottom stream product outlet port in the naphtha stripper and a second inlet port in the second heat exchanger unit, and an associated conduit is operably connected between a second outlet port of the second heat exchanger unit and a reactor unit product receiving inlet port in the naphtha stripper, with such conduit being in fluid communication through the second heat exchanger unit with the conduit connected to the second inlet port.

Accordingly, in this exemplary configuration, the reactor unit, the naphtha stripper, and the second heat exchanger unit are operably coupled so that when operationally employed the bottom stream product from the reactor unit flowing through a respective pair of the conduits and associated portions of the second heat exchanger unit is in thermal communication with the bottom stream product from the naphtha stripper flowing through the other pair of conduits and associated portions of the second heat exchanger unit to thereby conduct reboiling of the bottom stream product from the naphtha stripper through use of the bottom stream product from the reactor unit. Note, when the second process-to-process heat exchanger is configured to provide sufficient heat exchange capacity to reboil the bottom stream product from the naphtha stripper without use of a fired heater unit positioned to directly reboil the bottom stream product from naphtha stripper, the system can be and generally is configured to be devoid of a fired heater unit positioned to directly reboil the bottom stream product from naphtha stripper, reducing both utility and capital expenses.

According to an embodiment of the present invention, various sets of valves can be included to selectively control fluid flow through the various system components including, for example, the second heat exchanger unit. According to an exemplary configuration, the valves include a first set of valves located in the naphtha hydrotreat reaction process section for selectively directing the bottom stream product from the reactor unit either directly to a third heat exchanger unit or indirectly through the second heat exchanger unit, and can include a second set of valves located in the naphtha stripping process section for selectively directing the bottom stream product from the naphtha stripper either directly to the fired heater or indirectly through the second heat exchanger unit. Various other configurations are also within the scope of the present invention.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

FIGS. 1-8 provide examples of simulation files including stream data and detailed simulation results of conventional configurations and those according to various embodiment of the present invention, to illustrate various benefits without limiting the various embodiments of the invention's new energy efficient and environmentally conscious advanced configurations for the integrated Naphtha Hydrotreating (NHT) stripping and naphtha splitter processes and special one-heater-only process configurations for Hydrotreating stripping and naphtha splitter sections.

Figure 1:
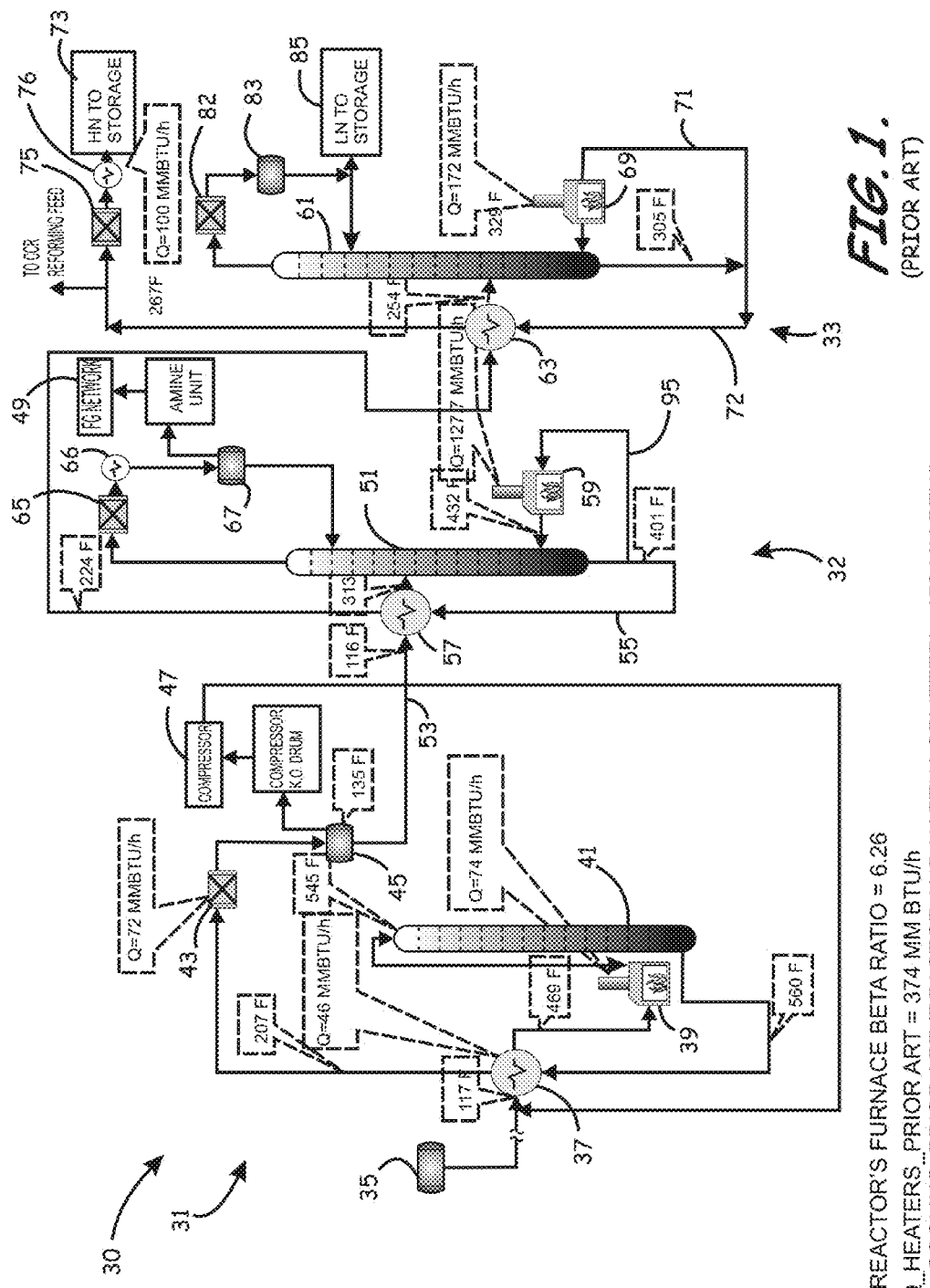
FIG. 1 is a schematic diagram of a naphtha hydrotreating process/system to hydrotreat naphtha feedstocks for provision to a refining reforming unit.

FIG. 1 illustrates a conventional hydrotreating process/system 30 that includes a reaction section 31, a contaminants stripping section 32, and a naphtha splitting section 33. The purpose of such hydrotreating process 30 is to eliminate impurities, mainly sulfur, but also nitrogen and arsenic, which affect the performance and life of the downstream reforming unit. In the reaction section 31 of this process 30, full range naphtha is mixed with hydrocracked naphtha from a hydrocracking unit (not shown) and with a raffinate stream from an Aromatics extraction unit (not shown), if any, in a naphtha reactor feed surge drum 35. The mixture is then pumped to the reaction section 31 where it is mixed with a hydrogen stream. This hydrogen stream is a combined process's recycle stream and a make-up one, as understood by one of ordinary skill in the art.

The mixture is heated up to the reaction temperature via process-to-process heat exchanger(s) 37 and a fired heater 39. The exemplary reaction section 31 is using a vapor phase reactor 41 where the hydrogenation, desulphurization, denitrogenation reactions are taking place on a hydrotreatment catalyst. The reactor effluent (bottom product from the reactor 41) is cooled down using a combination of the process-to-process heat exchanger 37 and an air/water cooler(s) 43. The cooled effluent is then pumped to a two- or three-phase separator 45 (e.g., knockout drum) to separate the gases from the liquid phase. Most of the separated gas is used as a recycle gas and is sent back to the reactor feed via a compressor 47. The rest, e.g., small part (not shown), of these gases are purged to a fuel gas system/network 49 to control the reaction section pressure.

The hydrocarbon liquid phase from the reaction section separation drum 45 is used as a feed to a hydrotreating naphtha stripper column/unit (naphtha stripper) 51 of the stripping section 32. The stripper 51 receives the feed through fluid pathway 53. The feed flowing through fluid pathway 53 is first preheated against the stripper bottom stream (stabilized naphtha) flowing through fluid pathway 55 in a process-to-process heat exchanger unit 57. The stripper bottom product flowing through fluid pathway 55 is then sent to a naphtha splitter column/unit (naphtha splitter) 61 of the naphtha splitter section 33 after being preheated by a process-to-process heat exchanger unit 63. Stripper reboiling is conducted by a fired heater 59 and circulating pump (not shown) which receives stripper bottom product either directly from a lower portion of the stripper or through a tap in fluid pathway 55.

Note, one of ordinary skill in the art would understand that reference to a fluid pathway includes reference to the various types of fluid carrying pathways and/or pipelines or other fluid carrying conduits, continuous or in sections interlaced with various components including valves, bypasses, taps, etc. Also, when referring to a fluid pathway extending to and beyond a heat exchanger unit, reference may be made to the fluid pathway being a single conduit/pipeline or two separate conduits/pipelines to form a single functional pathway with the first conduit/pipeline connected to an inlet in the heat exchanger and the second conduit/pipeline connected to an outlet of the heat exchanger.

The stripper overhead product is partially condensed, normally using an air cooler 65 and water cooler 66, and sent to a reflux drum 67. Liquid phase from the drum 67 is used as a reflux to the stripper column 51. The vapor phase from the reflux drum 67 is sent to the fuel gas system/network 49.

As noted above, the naphtha splitter column 61 of the naphtha splitter section 33 receives the stabilized naphtha (from stripper bottom product) flow through fluid pathway 55 as its feed, which is received after being preheated by process-to-process heat exchanger unit 57 and then by process-to-process heat exchanger unit 63. Reboiling of the naphtha splitter column 61 is normally conducted using a fired heater or medium pressure (MP) steam reboiler 69, which receives splitter bottom product via a fluid pathway 71 connected either directly from a lower portion of the splitter or through a tap in fluid pathway 72. Fluid pathway 72 provides heavy naphtha from the splitter bottom which is pumped and sent to a downstream reforming unit and/or storage tanks 73 after being cooled against the naphtha splitter column feed in a process-process heat exchanger 63, air cooler 75 and water cooler 76.

The naphtha splitter overhead is fully condensed in an air cooler 82 and sent to reflux drum 83 where part is used as a reflux to the naphtha splitter column and the rest is normally sent to an Isomerization unit (not shown) or associated storage unit 85.

Figure 2:
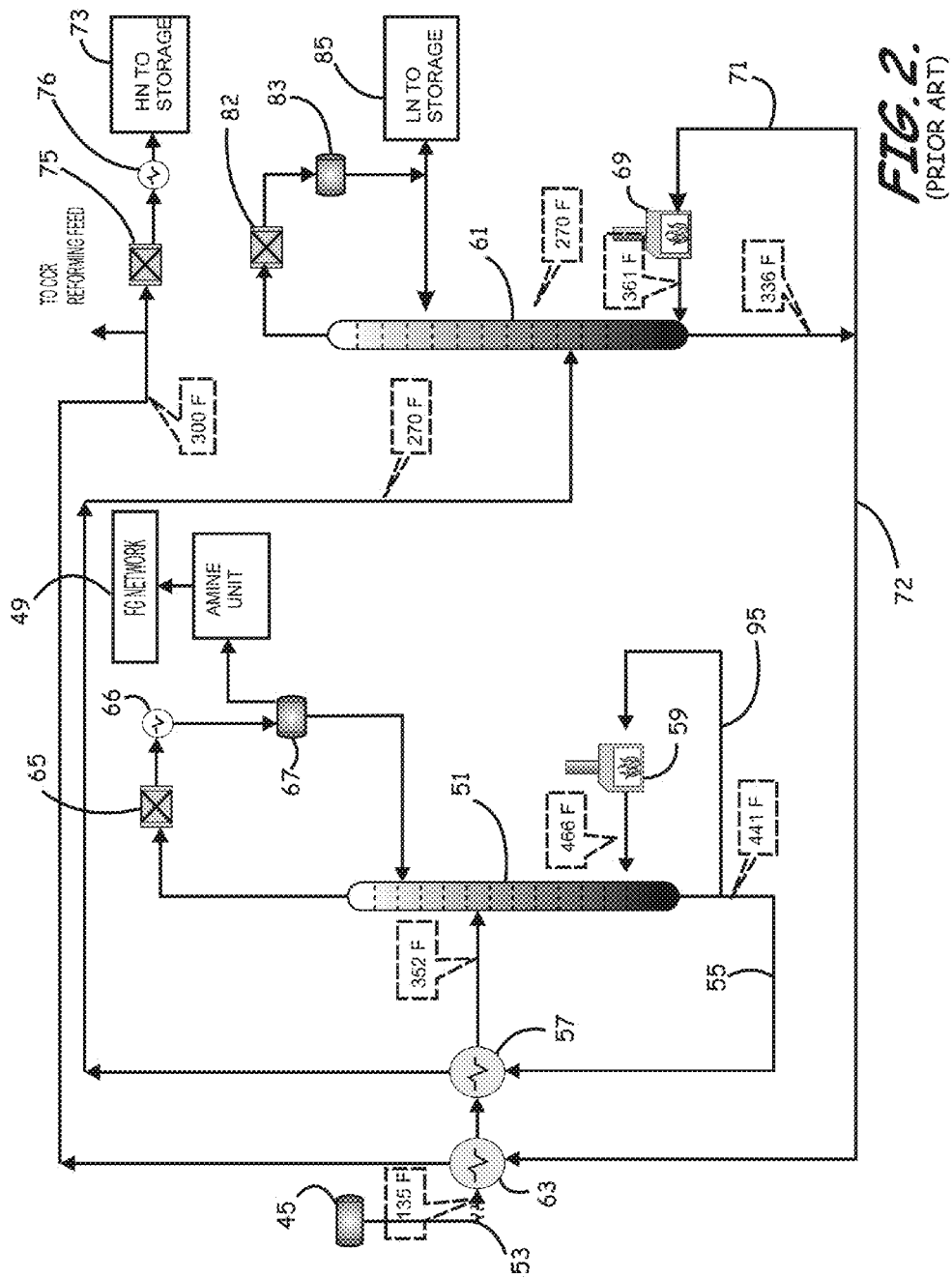
FIG. 2 is a schematic diagram of two primary sections of a naphtha hydrotreating process/system to hydrotreat naphtha feedstocks for provision to a refining reforming unit according to an alternative design.

FIG. 2 illustrates in alternative configuration to the conventional Hydrotreating process 30 shown in FIG. 1 whereby heat exchanger unit 63 is positioned in line with the feed to the stripper column 51 flowing through fluid pathway 53 rather than the stripper bottom product flowing through fluid pathway 55.

As noted previously, most of the old and recently built NHT plants use either Axens or UOP processes, with the two processes being almost the same. These two processes, shown in FIGS. 1 and 2, respectively, do not exhibit direct integration between the two stripping and naphtha splitting sections 32, 33. The feeds of the respective sections for both processes are preheated by one or more of the bottom products and the extra waste heat in the heavy naphtha stream is sent to the air and water coolers. The configuration illustrated in FIG. 1 is a little more efficient from an energy point of view than the configuration illustrated in FIG. 2, since it sends the heavy naphtha stream to the air and water coolers 75, 76 at a little lower temperature than the configuration illustrated in FIG. 2. Accordingly, the configuration illustrated in FIG. 1 provides a possible optimal base case for the sake of a benefits comparison between the conventional hydrotreating processes and those featured hydrotreating processes according to one or more embodiments of the present invention.

Figure 3:
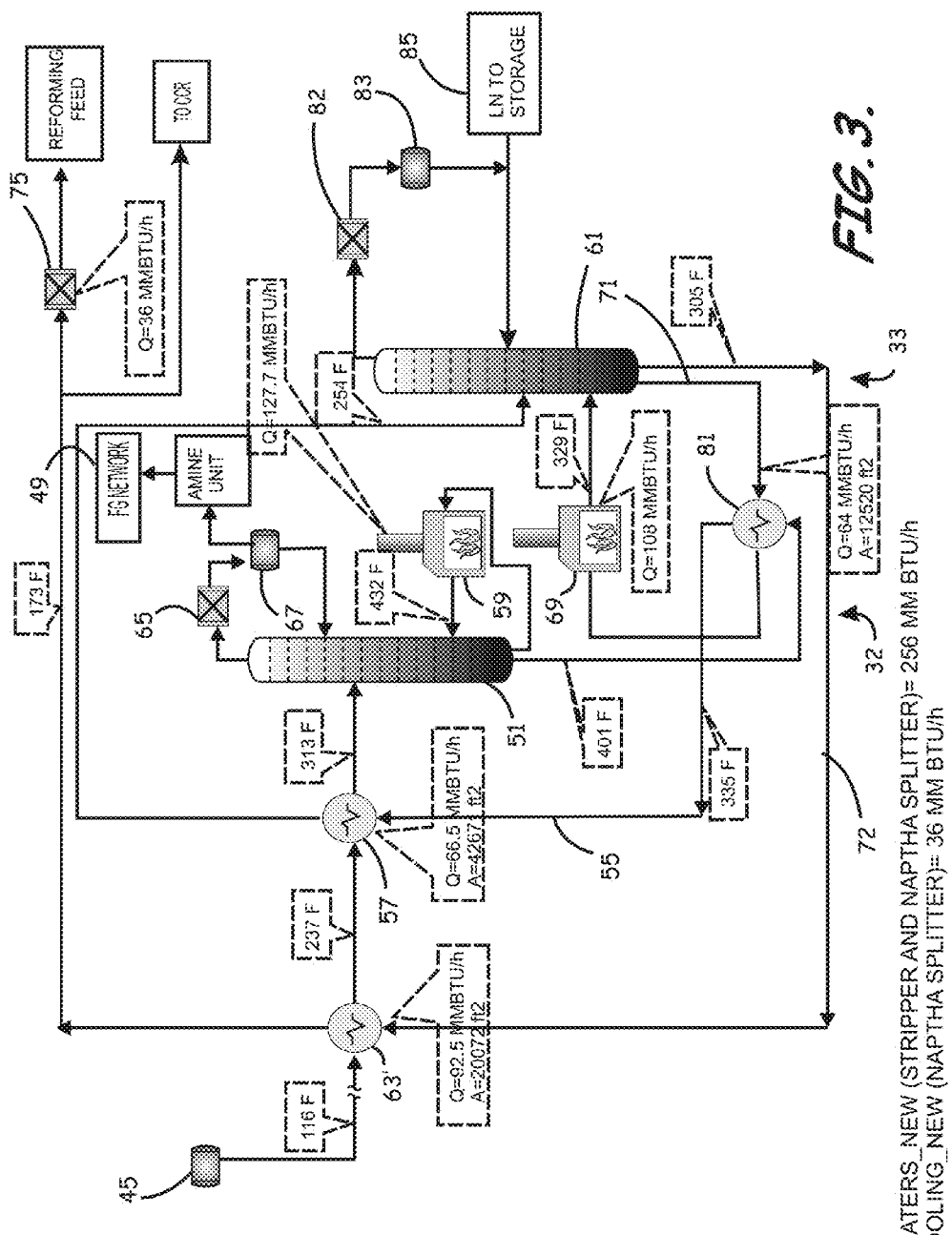
FIG. 3 is a schematic diagram of two primary sections of a naphtha hydrotreating process/system to hydrotreat naphtha feedstocks for provision to a refining reforming unit according to an embodiment of the present invention.

FIG. 3 illustrates an example of an embodiment of the present invention whereby the hydrotreating stripping section 32 and the naphtha splitter sections 33 are modified to provide direct integration between the two sections to reduce both the heating and cooling utilities, as well as the associated energy-based emissions. The exemplary configuration shown in the figure, for example, reduces both the hot load on the naphtha splitter section fired heater by 37% (e.g., 64 MMBTU/h less in the exemplary configuration of FIG. 3 from that of the configuration shown in FIG. 1) resulting in a reduction of the energy-based green house gas emissions by almost the same percentage for the section of the process, and a reduction in the cooling utilities duty requirement for the section of the process by 64% (e.g., 64 MMBTU/h less in the exemplary configuration of FIG. 3 from that of the configuration shown in FIG. 1). According to the illustrated example, such savings are obtained by using the stripper bottom product stream as one of two pivotal streams for direct heat integration between the hydrotreating stripper and naphtha splitter processes sections 32, 33. The second pivotal stream for such direct integration between the two process sections 32, 33 is the naphtha splitter bottom product (heavy naphtha feed stream) destined for the reforming unit.

According to the illustrated configuration, the hydrotreating stripping section 32 receives the hydrocarbon liquid phase feed from the reaction section separation drum 45 after being preheated against the naphtha splitter heavy naphtha product stream and the naphtha hydrotreating stripper bottom stream, respectively, via process-to-process heat exchangers 63' and 57. As in the prior described configurations, the stripper bottom product is then sent to naphtha splitter column 61, and the stripper overhead product is partially condensed, using an air cooler 65, and is sent to the reflux drum 67. Liquid phase from such drum 67 is used as a reflux to the stripper column 51, and the vapor phase from the reflux drum 67 is sent to the fuel gas system/network 49.

According to the new naphtha splitter section configuration, intra-integrated with the hydrotreating stripping section 32, the process is conducted via the continual receiving of the stabilized naphtha coming from stripper bottom product in the naphtha splitter column 61, but the reboiling of the naphtha splitter column 61 is now conducted using the stripper bottom product in combination with the fired heater 69. Specifically, an additional process-to-process heat exchanger 81 is positioned in the pathway of the reboiling stream for the naphtha splitter column 61, i.e., fluid pathway 71, and in the pathway of the stripper bottom stream (stabilized naphtha) flowing through fluid pathway 55. Beneficially, in the exemplary configuration, this utilization of the hydrotreating stripping section bottom product to assist in reboiling of the heavy naphtha bottom product results in the hot load savings of 37% in the fired heaters for the naphtha splitter section 33.

As per the conventional process, the naphtha splitter overhead is fully condensed in an air cooler 82 and is sent to the reflux drum 83 where part of the condensed liquid is used as a reflux to the naphtha splitter column 61 and the rest is sent to an Isomerization unit and/or stored in a storage unit 85 for later use.

As noted above, heavy naphtha feed from the splitter column bottom is pumped and sent to a reforming unit downstream and/or storage tanks 73. According to the enhanced naphtha splitter section configuration, heat exchanger 63 illustrated in FIGS. 1-2, is provided additional surface area or is otherwise modified/replaced in favor of heat exchanger unit 63' (FIG. 3) to provide aggressive cooling of the naphtha splitter bottom product flowing through fluid pathway 72 against the hydrotreating stripper feed stream flowing through fluid pathway 55.

This aggressive cooling of the heavy naphtha bottom stream product from the naphtha splitter column 61 performed before being sent to an air cooler 75 and/or water cooler 76 and before any other usage, results in the exemplary 64% saving in the naphtha splitter section air/water cooling utility. In fact, the efficiency of heat exchanger unit 63' can negate a need for a water cooler(s) and reduce the number and amount of required air fin coolers 75. For example, the improved configuration of FIG. 3 made upon the system of the FIG. 1 can reduce total heating utility for the combined stripper and splitter sections 32, 33, from 300 MMBTU/h to 236 MMBTU/h and total cooling utility from 100 MMBTU/h to 36 MMBTU/h. Further, such reduction in cooling utility requirements can negate a need for capital spending of water coolers, and can reduce capital costs for air fin fan coolers.

Figure 4:
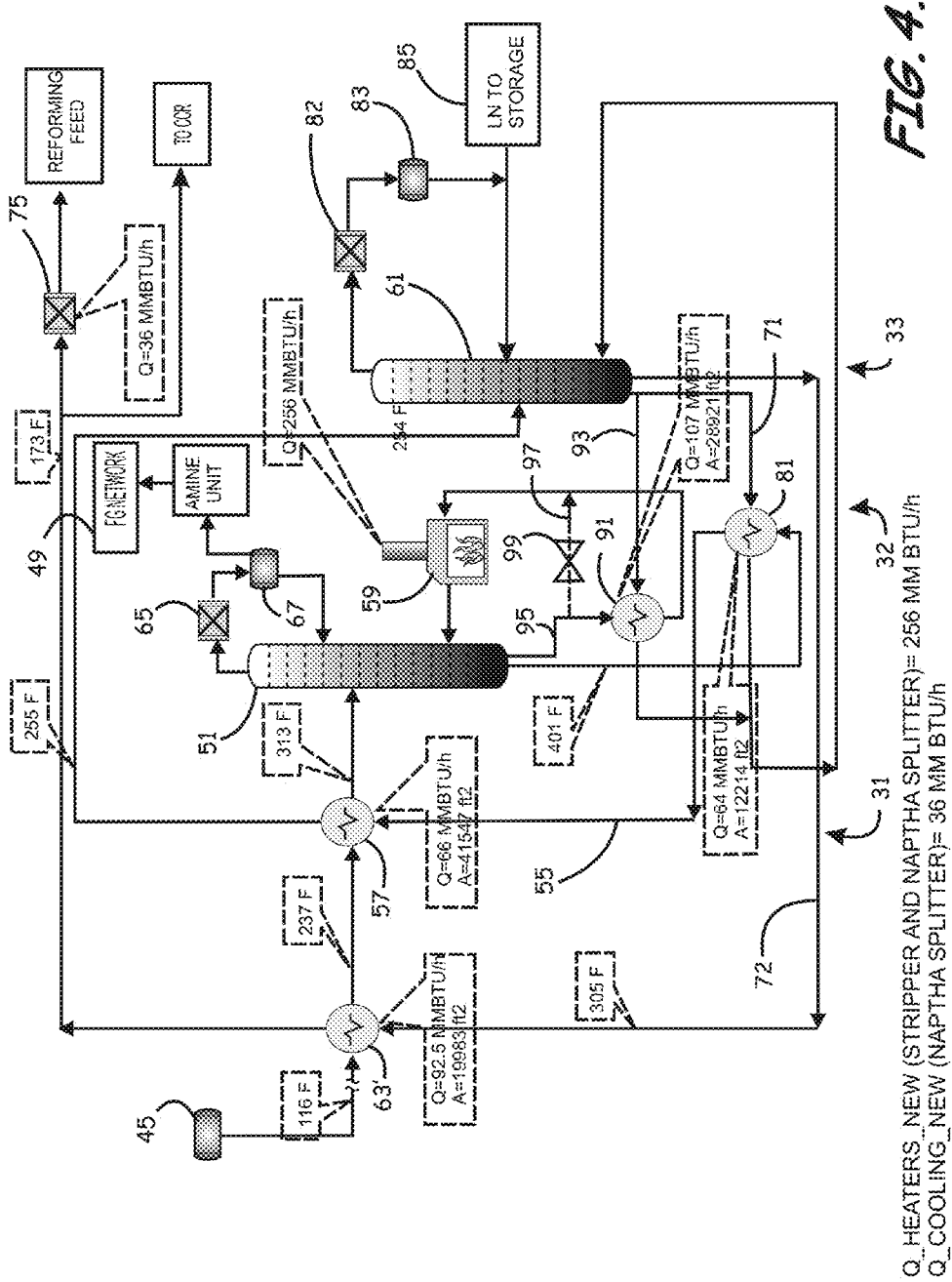
FIG. 4 is a schematic diagram of two primary sections of a naphtha hydrotreating process/system to hydrotreat naphtha feedstocks for provision to a refining reforming unit according to an embodiment of the present invention.

FIG. 4 illustrates a special case according to an embodiment of the present invention, where one fired heater only (e.g., fired heater 59) is desired. In such case, fired heater 69 can be removed or bypassed and the stripper reboiling can be conducted via heat exchange of portions of the naphtha splitter column reboiling stream with the reboiling stream destined for the stripper fired heater 69.

In such configuration, an additional process-to-process heat exchanger 91 configured to receive the naphtha splitter column reboiling stream flowing through the reboiling stream fluid pathway 93 and the stripper column reboiling stream flowing through reboiling stream fluid pathway 95 enroute to the stripper fired heater 59 provides reboiling of the splitter column reboiling stream with the stripper column reboiling stream. Fluid pathway 93 can be connected either directly from a lower portion of the splitter column 61 or through a tap in fluid pathway 71. Similarly, fluid pathway 95 can be connected either directly from a lower portion of the stripper column 51 or through a tap in fluid pathway 55. According to the exemplary configuration, a bypass conduit 97 and valve 99 can be provided to allow bypass of the heat exchanger 91 and/or to adjust the amount of flow of stripper bottom stream product through heat exchanger 91 to provide sufficient reboiling of the naphtha splitter column bottom stream product.

Beneficially, this special configuration, while it increases the thermal load on the stripper bottoms fired heater 59, enables the deletion of the naphtha splitter fired heater/steam reboiler(s) 69 by using the additional heat exchanger 91 in conjunction with an increase in the size of the stripper section fired heater 59, if needed to meet capacity.

Figure 5:
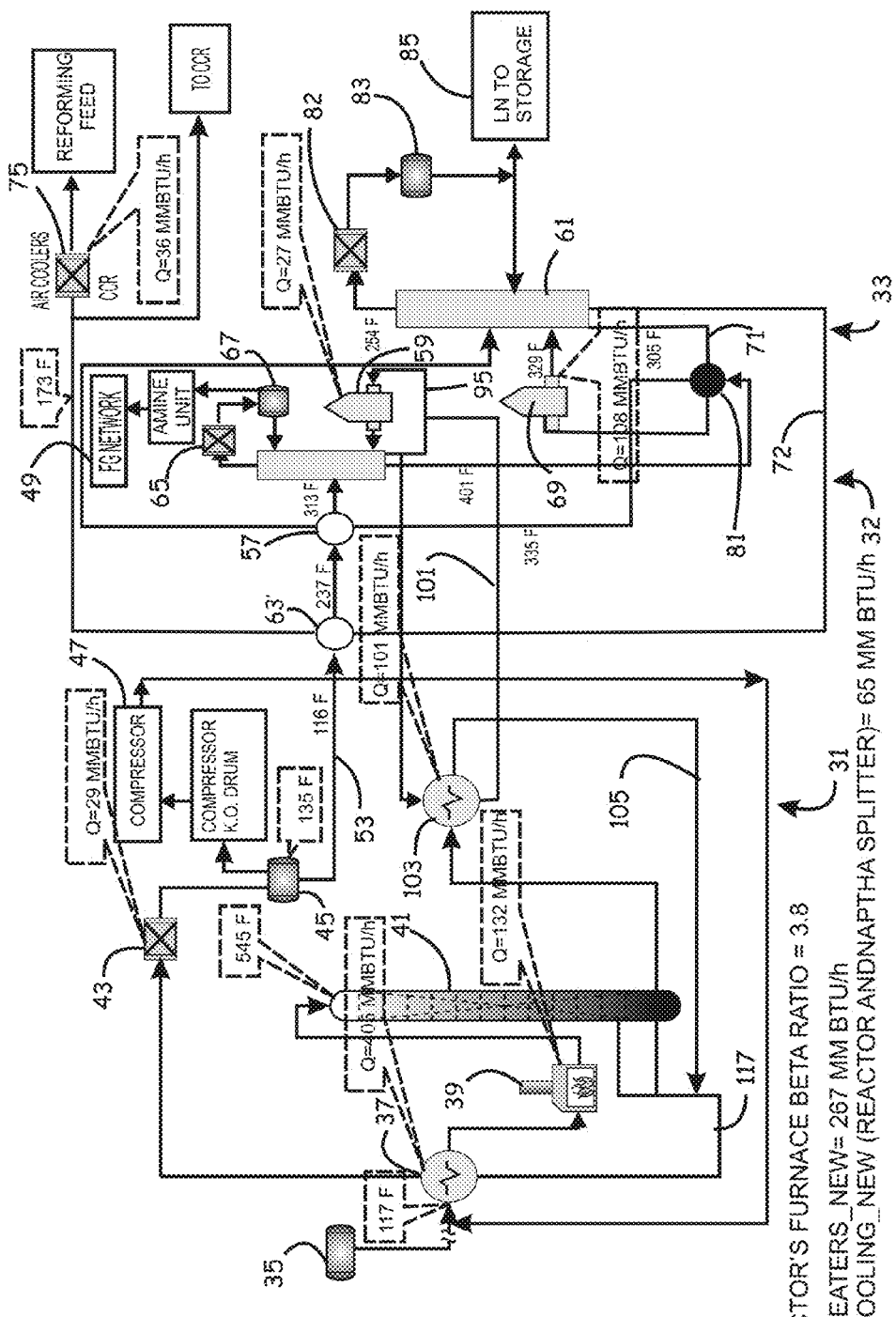
FIG. 5 is a schematic diagram of a naphtha hydrotreating process/system to hydrotreat naphtha feedstocks for provision to a refining reforming unit according to an embodiment of the present invention.
Figure 6:
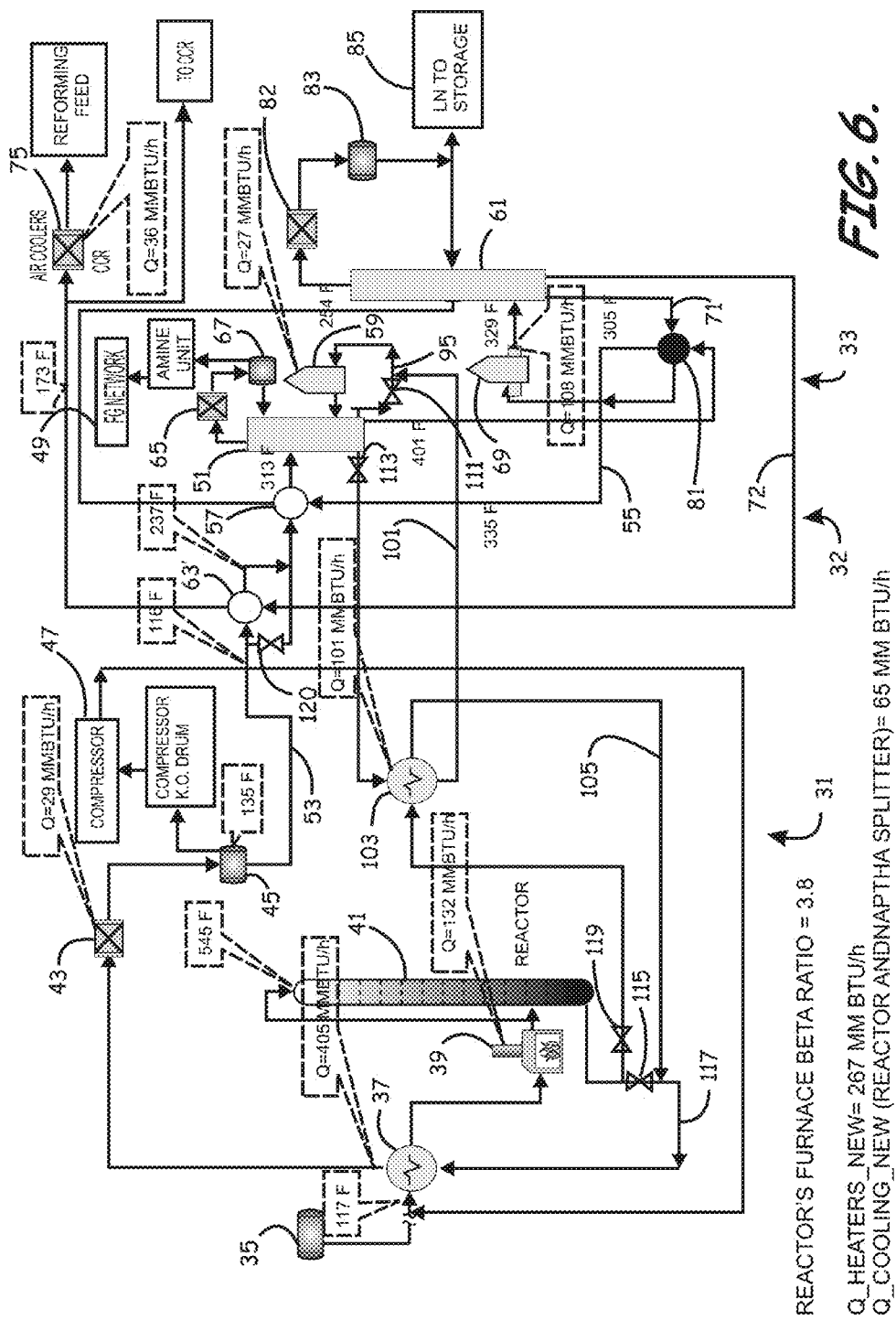
FIG. 6 is a schematic diagram of the naphtha hydrotreating process/system to hydrotreat naphtha feedstocks for provision to a refining reforming unit of FIG. 5 illustrating the application of valves according to an embodiment of the present invention.

FIGS. 5 and 6 provide examples of direct integration of the hydrotreating stripper section 32 with the reaction section 31, which is also integrated with the naphtha splitter section 33 as described with respect to FIG. 3. According to the illustrated embodiments, at least portions of the stripper reboiling stream (diverted through fluid pathway 101) is heated in a process-to-process heat exchanger 103 that exchanges heat with reactor section effluent diverted through fluid pathway 105. This configuration beneficially reduces the load on the stripper fired heater by approximately 101 MMBTU/h (from 127.7 MMBTU/h down to 27 MMBTU/h), and can reduce overall heating utility requirements for the three sections 31, 32, 33, from 374 MMBTU/h to 267 MMBTU/h and the overall cooling utility requirements from 172 MMBTU/h to 65 MMBTU/h.

According to the illustrated configuration of FIG. 6, valve 111 positioned within fluid pathway 95 can be used in conjunction with valve 113 positioned within fluid pathway 101 to control an amount of fluid flow diverted from fluid pathway 95, up to a complete diversion followed by a complete reintroduction. Similarly, valve 115 positioned within fluid pathway 117 can be used in conjunction with valve 119 within the fluid pathway 105 to control an amount of reactor effluent diverted from fluid pathway 117, up to a complete diversion followed by a complete reintroduction. The fluid pathway 101 can be connected either directly from a lower portion of the stripper column 51 (as shown) or via a tap in fluid pathway 95, and is connected at the end of the pathway to a return tap in fluid pathway 95. Similarly, fluid pathway 105 can be connected either directly from a lower portion of the reactor 41 a through a tap in fluid pathway 117 (as shown), and is connected at the end of the pathway to a return tap in fluid pathway 117. Additionally, valve 120 can control the amount of fluid entering heat exchanger 63' to control the amount of cooling of heavy naphtha feedstock performed en-route to the continuous catalyst circulation reactor (CCR) units.

Figure 7:
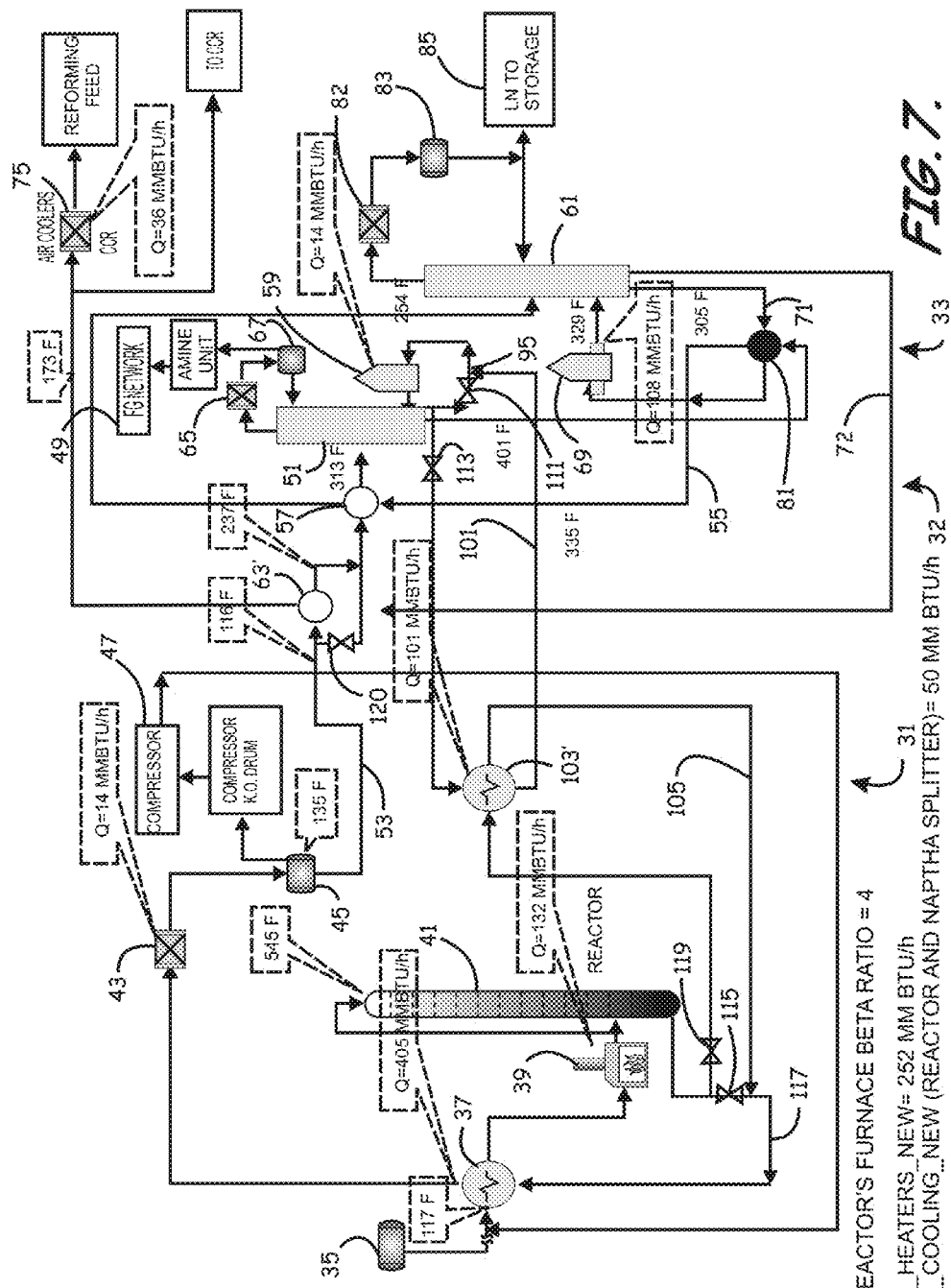
FIG. 7 is a schematic diagram of a naphtha hydrotreating process/system to hydrotreat naphtha feedstocks for provision to a refining reforming unit according to an embodiment of the present invention.

FIG. 7 provides a similar exemplary configuration to that shown in FIG. 5, but utilizing a higher surface area process-to-process heat exchanger unit 103' and/or higher flow rate capacities, further reducing the meeting utility requirements of the stripper fired heater 59 down to 14 MMBTU/h, and reducing overall heating utility and cooling utility requirements each by approximately 15 MMBTU/h.

Figure 8:
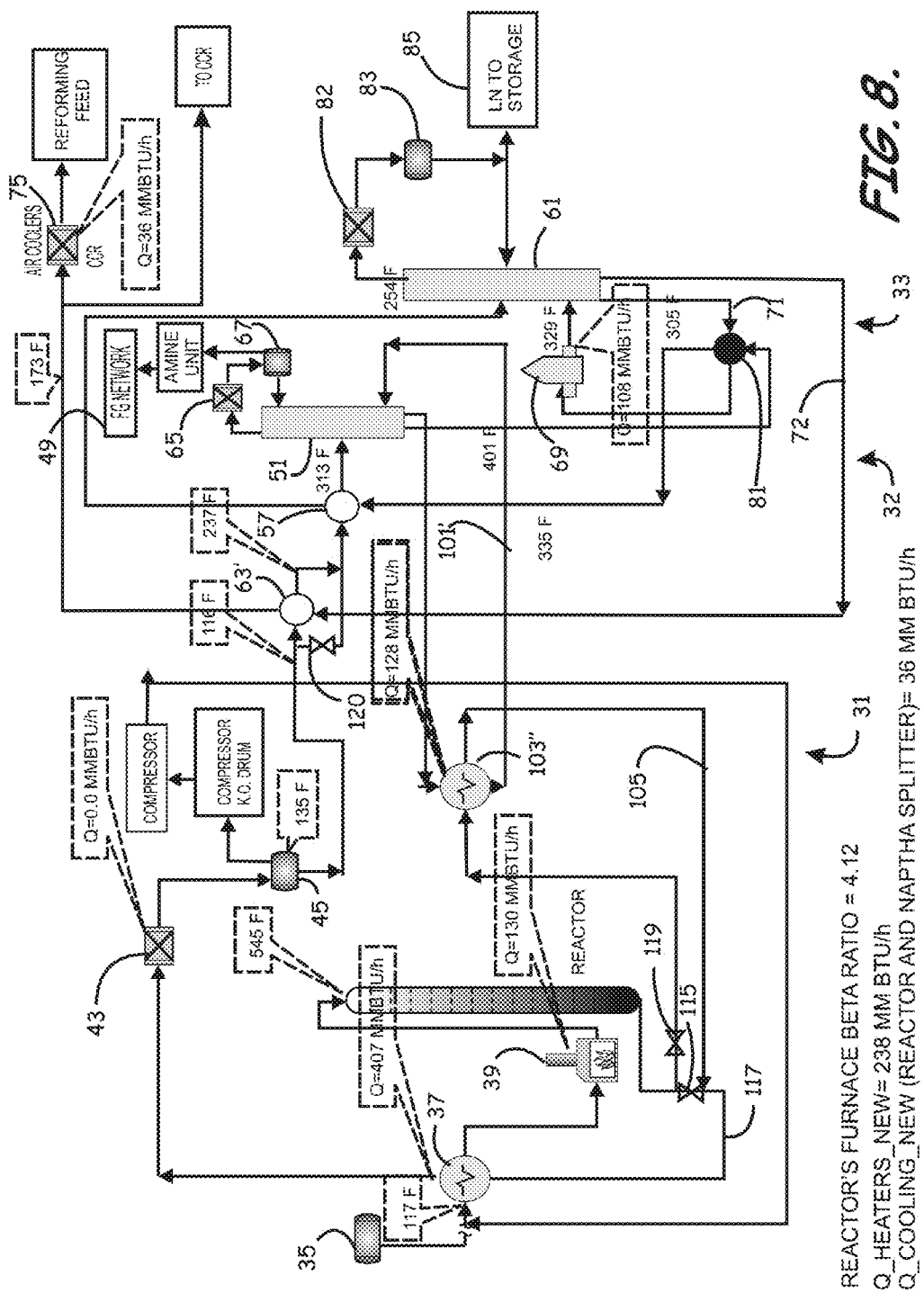
FIG. 8 is a schematic diagram of a naphtha hydrotreating process/system to hydrotreat naphtha feedstocks for provision to a refining reforming unit according to an embodiment of the present invention.

FIG. 8 provides another similar example utilizing an even higher surface area process-to-process heat exchanger unit 103" and/or flow rate capacity. In this particular configuration, the capacity of the heat exchanger unit 103" is sufficient to negate a need for the stripper fired heater 59 which can be either bypassed or, along with fluid pathway 95, can be removed/recycled. That is, heat exchanger unit 103" provides a heat exchange capacity of greater than the 127.7 MMBTU/h, and thus, reboiling can be accomplished solely through direct integration with the reactor section 31. Accordingly, in the illustrated configuration, fluid pathway 101' extends between a lower portion of the stripper column 51 at its inlet and the fired heater port in the side of stripper column 51 at its end to provide a complete reboiling circuit devoid of a fired heater. Additionally, as described with respect to FIG. 6, valves 115, 119 can be operated together to control the amount of reactor effluent delivered to heat exchanger unit 103" to thereby control reboiling temperatures.

Figure 9:
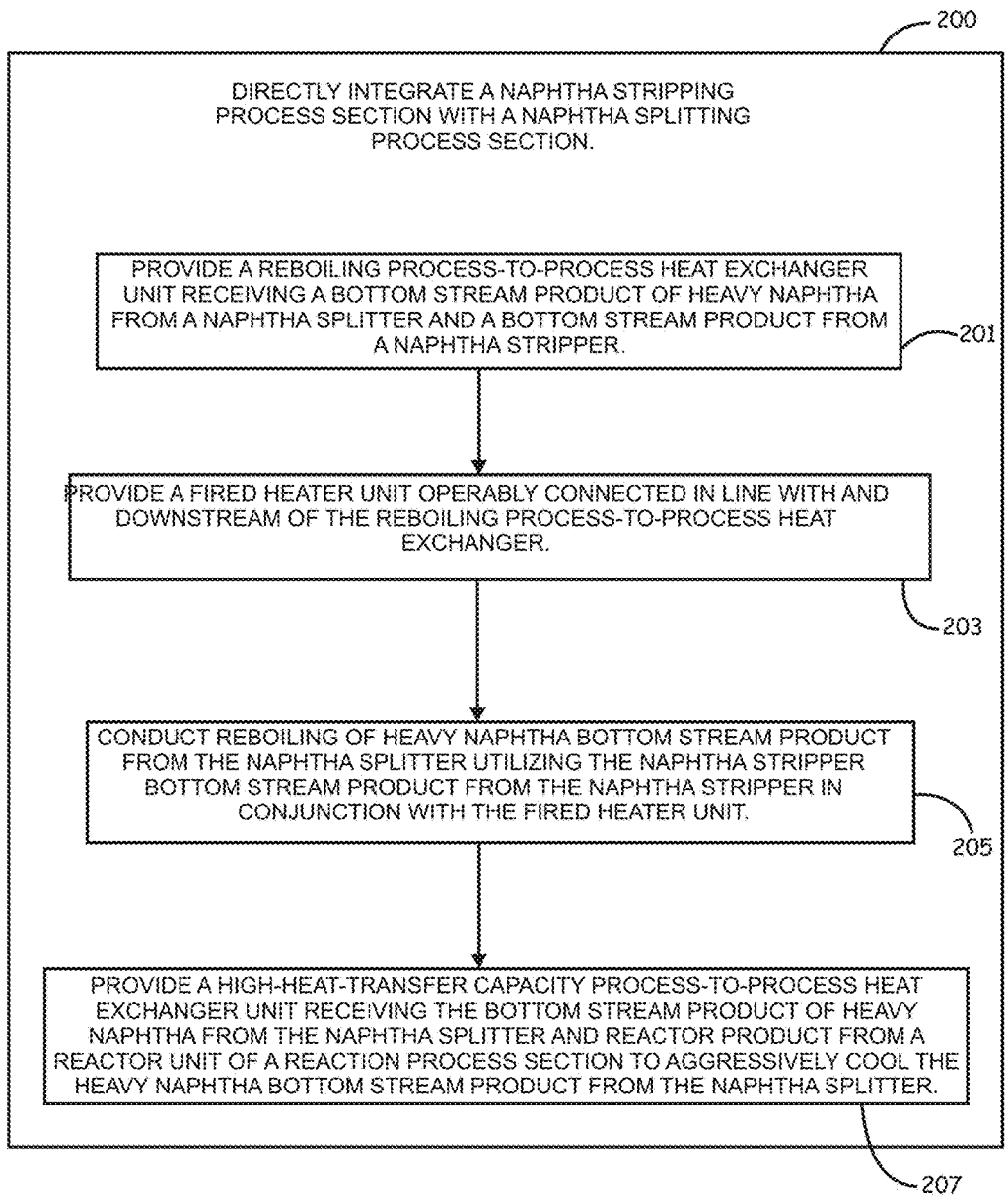
FIG. 9 is a schematic flow diagram illustrating steps for hydrotreating different naphtha feed stocks destined for a refining reforming unit and other applications according to an embodiment of the present invention.

FIG. 9 provides a flow diagram illustrating steps for providing hydrotreated naphtha feedstocks to a refining reforming unit according to an example embodiment of the present invention. Referring also to FIG. 3, the method includes the step of directly integrating a naphtha stripping process section 32 including a naphtha stripping column/unit (e.g., naphtha stripper 51) with a naphtha splitting process section 33 including a naphtha stripper column/unit (e.g., naphtha stripper 61) (block 200). The step of directly integrating includes providing a reboiling process-to-process heat exchanger unit 81 receiving a bottom stream product of heavy naphtha from a naphtha splitter 61 and a bottom stream product from a naphtha stripper 51 to transfer heat from the bottom stream product from the naphtha stripper 51 to bottom stream product from the naphtha splitter 61 (block 201), providing a fired heater unit 69 operably connected in line with and downstream of the reboiling process-to-process heat exchanger 81 to provide additional heat to the bottom stream product from the naphtha splitter 61 needed to reboil bottom stream product from naphtha splitter 61 (block 203), and conducting reboiling of heavy naphtha bottom stream product from the naphtha splitter 61 utilizing the naphtha stripper bottom stream product from the naphtha stripper 51 in conjunction with the fired heater unit 69 (block 205). The step of directly integrating a naphtha stripping process section 32 with a naphtha splitting process section 33 can also include providing a high-capacity second process-to-process heat exchanger unit 63' receiving the bottom stream product of heavy naphtha from the naphtha splitter 61 and reactor product from a reactor unit 41 of a reaction process section 31 to aggressively cool the heavy naphtha bottom stream product from the naphtha splitter 61 providing reforming feed to a refining reforming unit, to less than approximately 200° F., and more preferably approximately 173° F. (block 207). Beneficially, such configuration can facilitate further downstream cooling of the heavy naphtha bottom stream product using an air cooler 75 positioned to receive the heavy naphtha bottom stream product from the naphtha splitter 61, to an extent that the combination of second process-to-process heat exchanger unit 63' and air cooler 75 is sufficient to negate a need for a non air-cooled chilling unit.

Figure 10:
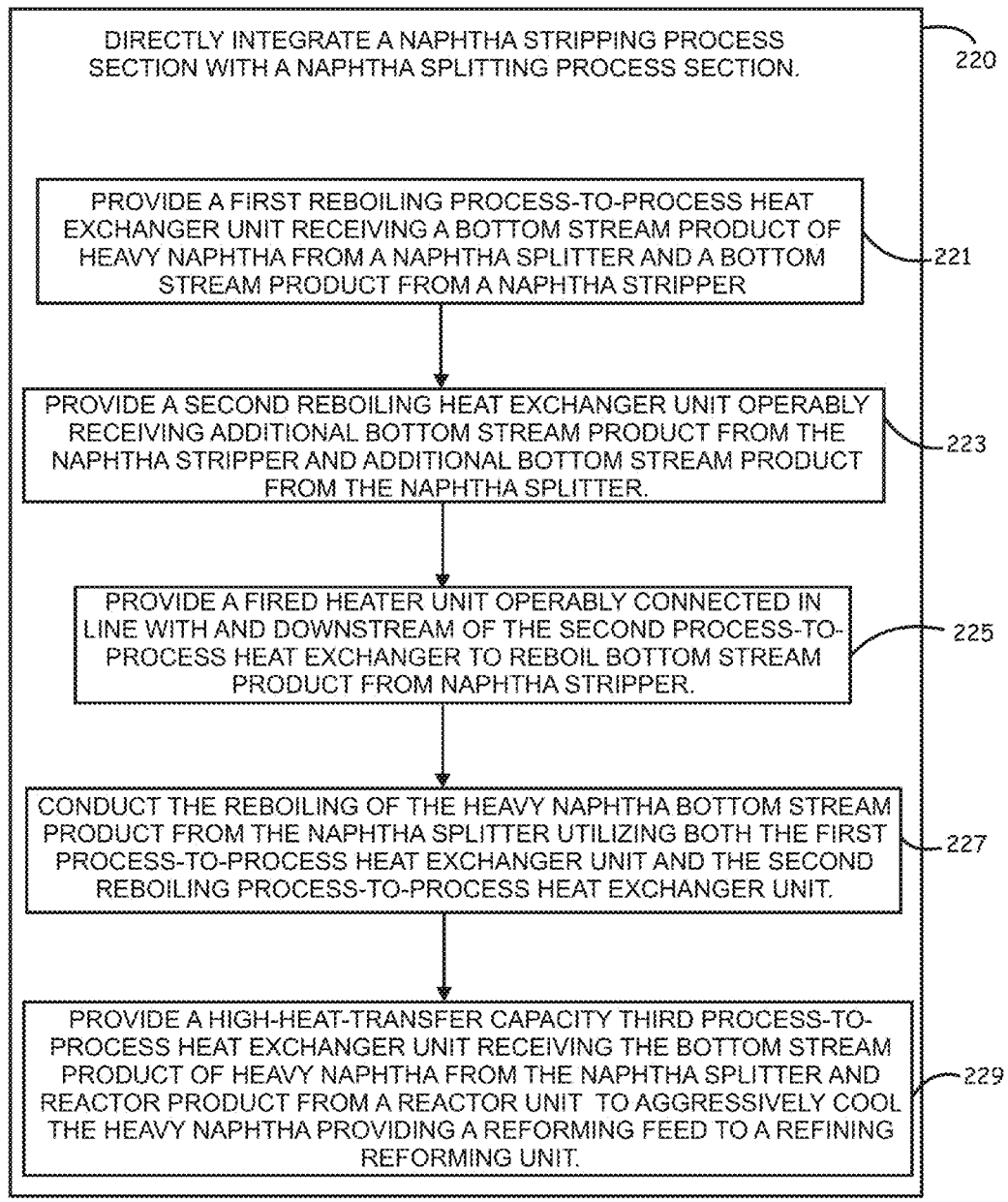
FIG. 10 is a schematic flow diagram illustrating steps for hydrotreating different naphtha feed stocks destined for a refining reforming unit and other applications according to an embodiment of the present invention.

FIG. 10 provides a flow diagram illustrating steps for providing hydrotreated naphtha feedstocks to a refining reforming unit according to another example embodiment of the present invention. Referring also to FIG. 4, the method includes the step of directly integrating a naphtha stripping process section 32 with a naphtha splitting process section 33 (block 220). The step of directly integrating sections 32, 33 includes providing a first reboiling process-to-process heat exchanger unit 81 receiving a bottom stream product of heavy naphtha from a naphtha splitter 61 and a bottom stream product from a naphtha stripper 51 to transfer heat from the bottom stream product from the naphtha stripper 51 to the bottom stream product from the naphtha splitter (block 221), providing a second reboiling heat exchanger unit 91 operably receiving additional bottom stream product from the naphtha stripper 51 and additional bottom stream product from the naphtha splitter 61 so that the additional bottom stream product from the naphtha stripper 51 provides heat energy to the additional bottom stream product from the naphtha splitter 61 to reboil the additional bottom stream product from the naphtha splitter init 61 (block 223), and providing a fired heater unit 55 operably connected in line with and downstream of the second process-to-process heat exchanger 91 to reboil bottom stream product from naphtha stripper 51 (block 225) to replenish heat transferred to the bottom stream product from the naphtha stripper 51 to bottom stream product from the naphtha splitter 61 and to apply additional heat thereto.

The direct integration between sections 32, 33 can also include conducting the reboiling of the heavy naphtha bottom stream product from the naphtha splitter 61 utilizing both the first process-to-process heat exchanger unit 81 (receiving heat from the naphtha stripper bottom stream product providing feed to the naphtha splitter 61) and the second reboiling process-to-process heat exchanger unit 91 (receiving heat from the naphtha stripper bottom stream product enroute to the fired heater unit 55) (block 227). Beneficially, according to this exemplary configuration, the first and the second reboiling process-to-process heat exchanger units 81, 91, are collectively configured to provide sufficient heat exchange capacity to reboil the bottom stream product from the naphtha splitter 61 without use of a fired heater unit (e.g. heater unit 69, FIG. 1) positioned to directly reboil the bottom stream product from naphtha splitter 61.

The step of directly integrating sections 32, 33 can further include providing a high-capacity third process-to-process heat exchanger unit 63' receiving the bottom stream product of heavy naphtha from the naphtha splitter 61 and reactor product from a reactor unit 41 of the reaction process section 31 to aggressively cool the heavy naphtha bottom stream product from the naphtha splitter 61 providing a reforming feed to a refining reforming unit, to a value less than 200° F., and more preferably approximately 173° F. (block 229). Beneficially, such configuration can facilitate further downstream cooling of the heavy naphtha bottom stream product using an air cooler 75 positioned to receive the heavy naphtha bottom stream product from the naphtha splitter 61, to an extent that the combination of the third process-to-process heat exchanger 63' and air cooler 75 is sufficient to negate a need for a non air-cooled chilling unit to cool the feed.

Figure 11:
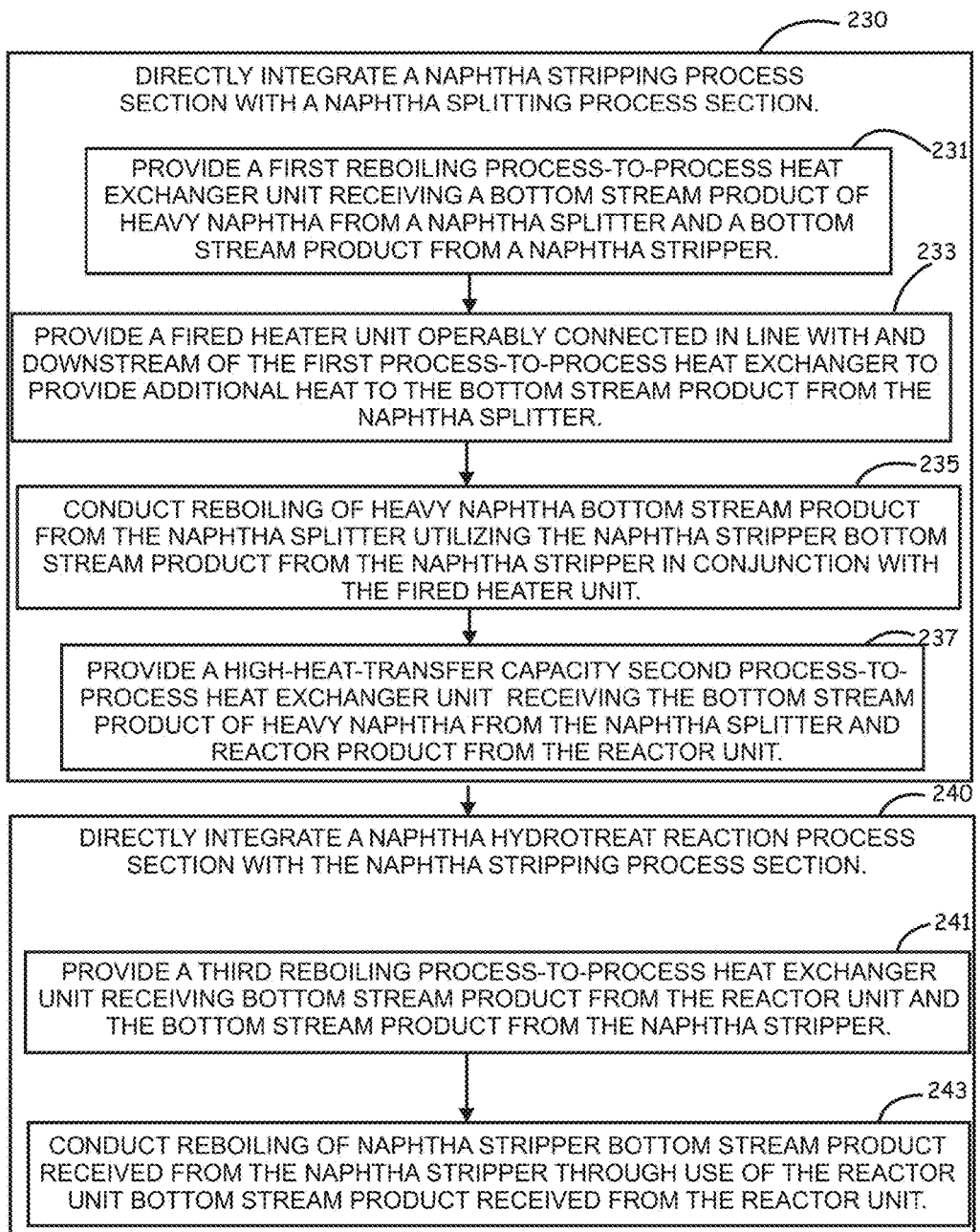
FIG. 11 is a schematic flow diagram illustrating steps for hydrotreating different naphtha feed stocks destined for a refining reforming unit and other applications according to an embodiment of the present invention.

FIG. 11 provides a flow diagram illustrating steps for providing hydrotreated naphtha feedstocks to a refining reforming unit according to another example embodiment of the present invention. Referring also to FIGS. 5 & 6, the method includes the step of directly integrating a naphtha stripping process section 32 with a naphtha splitting process section 33 (block 230), and directly integrating a naphtha hydrotreat reaction process section 31 with the naphtha stripping process section 32 (block 240). The step of directly integrating the naphtha stripping process section 32 with the naphtha splitting process section 33 includes, for example: providing a first (reboiling) process-to-process heat exchanger unit 81 receiving a bottom stream product of heavy naphtha from a naphtha splitter 61 and a bottom stream product from a naphtha stripper 51 to transfer heat from the bottom stream product from the naphtha stripper 51 to the bottom stream product from the naphtha splitter 61 (block 231), providing a fired heater unit 69 operably connected in line with and downstream of the first process-to-process heat exchanger 81 to provide additional heat to the bottom stream product from the naphtha splitter 61 needed to reboil bottom stream product from naphtha splitter 61 (block 233), and conducting reboiling of heavy naphtha bottom stream product from the naphtha splitter 61 utilizing the naphtha stripper bottom stream product from the naphtha stripper 51 in conjunction with the fired heater unit 69 connected in line with and downstream of the first reboiling process-to-process heat exchanger 81 (block 235).

The step of directly integrating sections 32, 33 can also include providing a high-capacity second (heat transfer) process-to-process heat exchanger unit 63' receiving the bottom stream product of heavy naphtha from the naphtha splitter 61 and reactor product from the reactor unit 41 of the reaction process section 31 to aggressively cool the heavy naphtha bottom stream product from the naphtha splitter 61 (providing reforming feed to a refining reforming unit) to less than 200° F., and more preferably approximately 173° F. (block 237).

The step of directly integrating a naphtha hydrotreat reaction process section 32 with the naphtha stripping process section 31 includes, for example: providing a third (reboiling) process-to-process heat exchanger unit 103, 103', 103" receiving bottom stream product from the reactor unit 41 and the bottom stream product from the naphtha stripper 51 so that the bottom stream product from the reactor unit 41 provides heat energy to the bottom stream product from the naphtha stripper (block 241), and conducting reboiling of naphtha stripper bottom stream product received from the naphtha stripper 51 by the third (reboiling) process-to-process heat exchanger unit 103, 103', 103" through use of the reactor unit bottom stream product received from the reactor unit 41 by the third (reboiling) process-to-process heat exchanger unit 103, 103', 103" (block 243).

Referring also to FIGS. 7 & 8, the step of providing the third (reboiling) process-to-process heat exchanger unit 103, 103', 103" can include increasing the surface area of the heat exchanger unit 103, 103', 103" and/or increasing the flow rate of the bottom stream product from the reactor unit 41 and/or the flow rate of the bottom stream product from the naphtha stripper 51 as necessary to reduce the amount of heating utility required for reboiling the stripper bottom stream product, up to an extent of providing sufficient heat exchange capacity to reboil the bottom stream product from the naphtha stripper 51 without use of the fired heater unit 59 positioned to directly reboil the bottom stream product from naphtha stripper 51.

FIGS. 7 and 8 beneficially illustrate that various configurations can be obtained/derived from the base configuration shown in FIGS. 5 and 6 with the various benefits described previously, but with different levels/values for energy consumption savings, greenhouse gas emission reductions, and waste heat recovery according to an easily managed configuration retrofittable for future energy and greenhouse gas reductions. Additionally, such base configuration provides for better flexibility (lower β ratio) in the reaction section heater according to the changing needs/desires/objectives/economics of the process owners, which generally differ from one location to another.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A method of providing hydrotreated naphtha feedstocks to a refining reforming unit by directly integrating a naphtha splitting process section and a naphtha stripping process section, the method comprising the steps of:
   providing bottom stream product of heavy naphtha from a naphtha splitter of the naphtha splitting process section to a heat exchanger unit;
   providing bottom stream product from a naphtha stripper from a naphtha stripping process section to the heat exchanger unit, the bottom stream product from the naphtha stripper providing heat energy to the bottom stream product from the naphtha splitter to thereby conduct reboiling of the naphtha bottom stream product from the naphtha splitter through use of the bottom stream product from the naphtha stripper.

2. A method as defined in claim 1, wherein conducting reboiling of bottom stream product from the naphtha splitter further comprises utilizing a fired heater unit connected in line with and downstream of the process-to-process heat exchanger.

3. A method as defined in claim 1, wherein the heat exchanger unit is a heat exchanger unit, the method further comprising the steps of:
providing the heavy naphtha bottom stream product from the naphtha splitter as a reforming feed to a refining reforming unit; and
cooling the heavy naphtha bottom stream product from the naphtha splitter provided to the refining reforming unit to less than 200° F. using a second process-to-process heat exchanger positioned to transfer heat to reactor product from a reactor unit of a reaction process section to thereby facilitate further downstream cooling of the heavy naphtha bottom stream product using an air cooler positioned to receive the heavy naphtha bottom stream product from the naphtha splitter, the combination of second process-to-process heat exchanger and air cooler sufficient to negate a need for a non-air-cooled chilling unit.

4. A method as defined in claim 1, wherein the process-to-process heat exchanger unit is a first reboiling process-to-process heat exchanger unit configured to transfer heat from bottom stream product from the naphtha stripper to bottom stream product from the naphtha splitter, the method further comprising the steps of:
providing a fired heater unit operably positioned to reboil bottom stream product from naphtha stripper;
providing a second heat exchanger unit operably positioned to receive additional bottom stream product from the naphtha stripper and additional bottom stream product from the naphtha splitter so that the additional bottom stream product from the naphtha stripper provides heat energy to the additional bottom stream product from the naphtha splitter to reboil the additional bottom stream product from the naphtha splitter; and
conducting reboiling of the bottom stream product from the naphtha splitter, the reboiling conducted utilizing the first and the second heat exchanger units.

5. A method as defined in claim 4, wherein the first and the second heat exchanger units are collectively configured to provide sufficient heat exchange capacity to reboil the bottom stream product from the naphtha splitter without use of a fired heater unit positioned to directly reboil the bottom stream product from naphtha splitter, the naphtha splitting process section being devoid of a fired heater unit.

6. A method as defined in claim 1, wherein the heat exchanger unit is a first reboiling process-to-process heat exchanger unit configured to transfer heat from bottom stream product from the naphtha stripper to bottom stream product from the naphtha splitter, the method further comprising the step of directly integrating a naphtha hydrotreat reaction process section with the naphtha stripping process section, the direct integration comprising:
providing a second process-to-process heat exchanger unit receiving bottom stream product from the reactor unit and the bottom stream product from the naphtha stripper so that the bottom stream product from the reactor unit provides heat energy to the bottom stream product from the naphtha stripper; and conducting reboiling of naphtha stripper bottom stream product received from the naphtha stripper by the second process-to-process heat exchanger unit through use of the reactor unit bottom stream product received from the reactor unit by the second heat exchanger unit.

7. A method as defined in claim 6, wherein the second heat exchanger unit is configured to provide sufficient heat exchange capacity to reboil the bottom stream product from the naphtha stripper without use of a fired heater unit positioned to directly reboil the bottom stream product from naphtha stripper, the naphtha stripping process section being devoid of a fired heater unit.

8. A method as defined in claim 6, further comprising the step of:
selectively controlling fluid flow through the second heat exchanger unit, to include employing a first set of valves located in the naphtha hydrotreat reaction process section positioned for selectively directing the bottom stream product from the reactor unit either directly to a third heat exchanger unit positioned to receive naphtha distillate distilled from a crude oil distiller and the bottom stream product from the reactor unit or indirectly through the second heat exchanger unit, and employing a second set of valves located in the naphtha stripping process section positioned for selectively directing the bottom stream product from the naphtha stripper either directly to the fired heater or indirectly through the second reboiling process-to-process heat exchanger unit, the plurality of valves adjusted so that both the bottom stream product from the naphtha stripper and the bottom stream product from the reactor unit flow through the second heat exchanger when reboiling the bottom stream product from the naphtha stripper using the bottom stream product from the reactor unit is desired and adjusted so that neither of the streams flow through the second heat exchanger when reboiling of the bottom stream product from the naphtha stripper using the bottom stream product from the reactor unit is not desired.

9. A method of providing hydrotreated naphtha feedstocks to a refining reforming unit, the method comprising the steps of:
directly integrating a naphtha stripping process section with a naphtha splitting process section to enhance energy efficiency of a naphtha hydrotreating process, the direct integration comprising:
providing a first heat exchanger unit receiving a bottom stream product of heavy naphtha from a naphtha splitter and a bottom stream product from a naphtha stripper, the bottom stream product from the naphtha stripper providing heat energy to the bottom stream product from the naphtha splitter; and
conducting reboiling of heavy naphtha bottom stream product from the naphtha splitter, the reboiling conducted utilizing naphtha stripper bottom stream product from the naphtha stripper;
directly integrating a naphtha stripping process section with a naphtha hydrotreat reaction process section to enhance energy efficiency of a naphtha hydrotreating process, the direct integration comprising:
providing a second heat exchanger unit receiving bottom stream product from the reactor unit and additional bottom stream product from the naphtha stripper so that the bottom stream product from the reactor unit provides heat energy to the additional bottom stream product from the naphtha stripper;

conducting reboiling of the additional bottom stream product from the naphtha stripper, the reboiling conducted utilizing bottom stream product from the reactor unit;

wherein a beta ratio of the reactor furnace is at least 3.8.

10. A method as defined in claim 9, wherein the heating requirements for the naphtha stripping process section, the naphtha splitting process section, and the naphtha hydrotreat reaction process section is less than 297 one million British Thermal Units (MMBTU) per hour.

11. A method as defined in claim 9, wherein the cooling requirements for the naphtha stripping process section, the naphtha splitting process section, and the naphtha hydrotreat reaction process section is less than 65 one million British Thermal Units (MMBTU) per hour.

12. A method as defined in claim 9, comprising providing a fired heater unit connected in line with and downstream of the second heat exchanger unit, wherein the reboiling of naphtha bottom stream product from the naphtha splitter further utilizes the fired heater unit.

13. A method as defined in claim 12, wherein providing the second heat exchanger unit comprising providing the second heat exchanger unit having at least one of a surface area and a flow rate capacity such that the load on the fired heater unit is less than 27 one million British Thermal Units (MMBTU) per hour.

14. A method as defined in claim 9, comprising:
providing a third heat exchanger unit receiving a hydrocarbon liquid phase from the reactor unit and additional bottom stream product from the naphtha splitter so that the additional bottom stream product from the naphtha splitter provides heat energy to the hydrocarbon liquid phase from the reactor unit.

15. A method as defined in claim 14, wherein comprising:
heating the hydrocarbon liquid phase from the reactor unit to a temperature of at least 313° F. before providing the hydrocarbon liquid phase from the reactor unit as a feed to the naphtha stripper; and
cooling the additional bottom stream product from the naphtha splitter to at least 254° F. before providing the additional bottom stream product from the naphtha splitter as a feed to the naphtha stripper.

16. A method as defined in claim 9, wherein providing the first heat exchanger unit receiving bottom stream product of heavy naphtha from a naphtha splitter and bottom stream product from a naphtha stripper comprising modifying the first heat exchanger unit to increase a surface area of the first heat exchanger unit.

17. A method of retrofitting a naphtha hydrotreating system to reduce the overall heating utility requirements and the overall cooling requirement for a naphtha stripping process section, naphtha splitting process section, and a naphtha hydrotreat reaction process section, the method comprising the steps of:

directly integrating a naphtha splitting process section and a naphtha stripping process section, the direct integration comprising:
providing a first heat exchanger unit receiving a bottom stream product of heavy naphtha from a naphtha splitter and a bottom stream product from a naphtha stripper, the bottom stream product from the naphtha stripper providing heat energy to the bottom stream product from the naphtha splitter;

directly integrating a naphtha stripping process section with a naphtha hydrotreat reaction process section to enhance energy efficiency of a naphtha hydrotreating process, the direct integration comprising:
increasing the surface area of a second heat exchanger unit receiving bottom stream product from the reactor unit and the bottom stream product from the naphtha stripper so that the bottom stream product from the reactor unit provides heat energy to the bottom stream product from the naphtha stripper and reduces the overall heating utility and cooling utility requirements of the naphtha stripping process section, naphtha splitting process section, and a naphtha hydrotreat reaction process section; and
increasing the surface area of a third heat exchanger unit receiving a hydrocarbon liquid phase from the reactor unit and bottom stream product from the naphtha splitter so that the bottom stream product from the naphtha splitter provides heat energy to the hydrocarbon liquid phase from the reactor unit and reduces the overall heating utility and cooling utility requirements of the naphtha stripping process section, naphtha splitting process section, and a naphtha hydrotreat reaction process section.

18. A method as defined in claim 17, wherein the heating requirements for the naphtha stripping process section, the naphtha splitting process section, and the naphtha hydrotreat reaction process section are less than 297 one million British Thermal Units (MMBTU) per hour.

19. A method as defined in claim 17, wherein the cooling requirements for the naphtha stripping process section, the naphtha splitting process section, and the naphtha hydrotreat reaction process section are less than 65 one million British Thermal Units (MMBTU) per hour.

20. A method as defined in claim 17, comprising removing a fired heater unit connected in line with and downstream of the second heat exchanger unit.

* * * * *